United States Patent [19]

Matsuo

[11] Patent Number: 4,625,982
[45] Date of Patent: Dec. 2, 1986

[54] HANDLE LEVER STEERING DEVICE OF THREE-WHEEL AND FOUR-WHEEL AUTOMOTIVE VEHICLES

[75] Inventor: Isamu Matsuo, Ono, Japan

[73] Assignee: Kawasaki Jukogyo Kabushiki Kaisha, Japan

[21] Appl. No.: 706,173

[22] Filed: Feb. 27, 1985

[30] Foreign Application Priority Data

Feb. 29, 1984 [JP] Japan ................................. 59-39282

[51] Int. Cl.$^4$ ............................................. B62D 7/16
[52] U.S. Cl. .................................... 280/95 R; 280/267
[58] Field of Search ............... 280/93, 95 R, 263, 267, 280/268, 269, 282, 771; 180/210

[56] References Cited

U.S. PATENT DOCUMENTS

| | | | |
|---|---|---|---|
| 672,030 | 4/1901 | Clark | 280/95 R |
| 1,030,081 | 6/1912 | Gran | 280/95 R |
| 2,800,336 | 7/1957 | Major et al. | 280/95 R |
| 4,079,807 | 3/1978 | Hornagold et al. | 280/95 R |
| 4,460,197 | 7/1984 | Rogers | 280/95 R |

*Primary Examiner*—John J. Love
*Assistant Examiner*—Charles R. Watts

[57] ABSTRACT

A handle lever steering device including a handle lever and a pair of knuckle arms pivotally supported by a frame and constituting the Ackermann mechanism has a rod end secured to a rotary shaft for supporting the handle lever and having a first support shaft and a second support shaft. The first support shaft is connected to a support shaft connected to an arm of one of the left and right knuckle arms, and the second support shaft is connected to a support shaft connected to an arm of the other knuckle arm. The first and second support shafts and the rotary shaft for supporting the handle lever are located on an imaginary straight line. The ratio of the distance $Y_l$ between the center of the rotary shaft for supporting the handle lever and the center of the first support shaft to the distance $X_l$ between the center of the support shaft connected to the arm of one knuckle arm connected to the first support shaft and the center of a rotary shaft for supporting the one knuckle arm is substantially equal to the ratio of the distance $Y_r$ between the center of the rotary shaft for supporting the handle lever and the center of the second support shaft to the distance $X_r$ between the center of the support shaft connected to the arm of the other knuckle arm connected to the second support shaft and the center of a rotary shaft for supporting the other knuckle arm.

1 Claim, 2 Drawing Figures

HANDLE LEVER STEERING DEVICE OF THREE-WHEEL AND FOUR-WHEEL AUTOMOTIVE VEHICLES

FIELD OF THE INVENTION

This invention relates to a handle lever steering device suitable for use with a three-wheel automotive vehicle and a four-wheel automotive vehicle having left and right front wheels.

DESCRIPTION OF THE PRIOR ART

Figure 1:
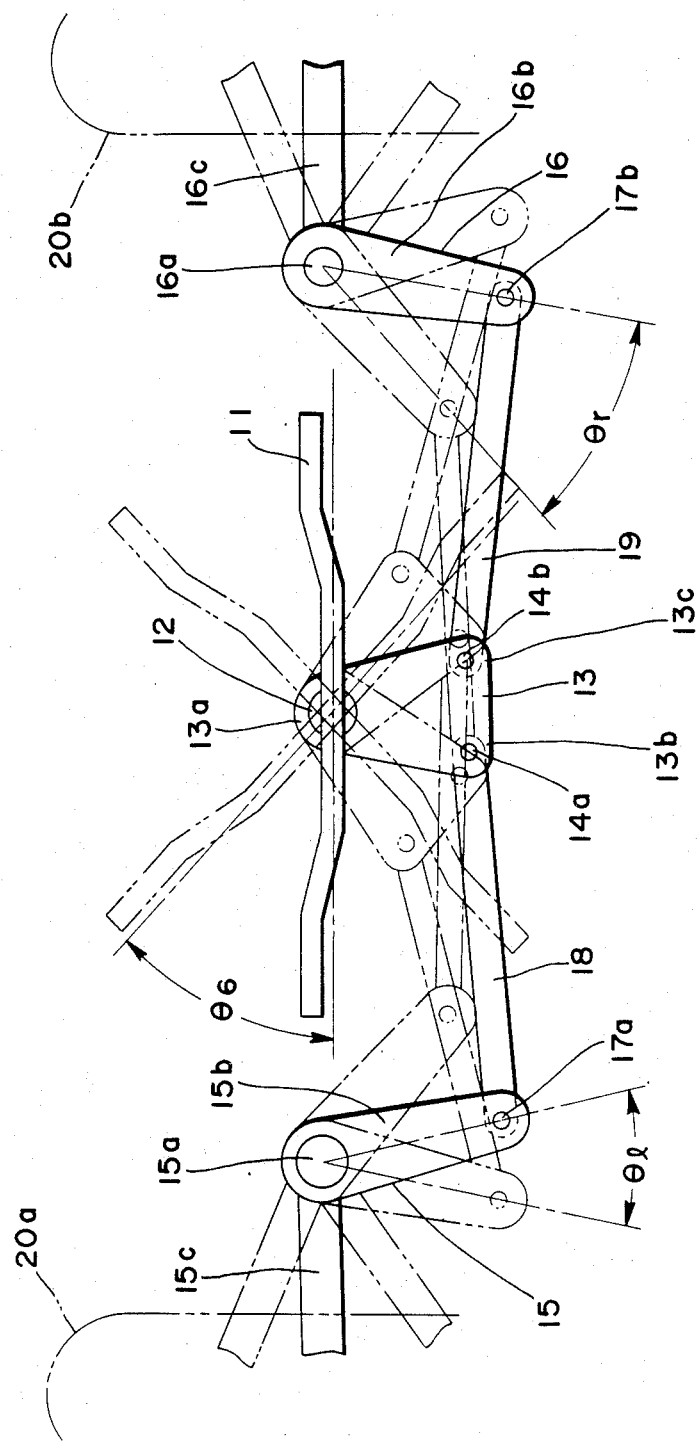
FIG. 1 is a plan view of a handle lever steering device of the prior art.

FIG. 1 shows one type of handle lever steering device of the prior art suitable for use with a three-wheel automotive vehicle and a four-wheel automotive vehicle. A handle lever 11 is pivotally supported by a rotary shaft 12 of a frame, not shown, which has secured thereto a vertex 13a of a rod end 13 in the form of a triangle having a first support shaft 14a and a second support shaft 14b located symmetrically at a left lower corner 13b and a right lower corner 13c, respectively. Meanwhile, disposed leftwardly and rightwardly of the rotary shaft 12 are rotary shafts 15a and 16a for supporting knuckle arms 15 and 16, respectively, which are rotatably supported by the frame, not shown. The left and right knuckle arms 15 and 16 include a left arm 15b and a right arm 16b which have a support shaft 17a and a support shaft 17b, respectively. The support shafts 17a and 17b are connected to the first support shaft 14a and the second support shaft 14b of the rod end 13 of the triangular shape through tie rods 18 and 19, respectively, while axles 15c and 16c are connected to outer sides of the left arm 15b and right arm 16b for supporting wheels 20a and 20b, respectively. The parts described hereinabove constitute the Ackermann mechanism.

In this type of steering device, when the angle of pivotal movement of the handle lever 11 reaches the uppermost limit, a great difference is produced in the angle of pivotal movement of the left and right knuckle arms 15 and 16. For example, when the handle lever 11 is turned to the right to increase the angle of pivotal movement $\theta_6$ of the handle lever 11 from 6° to about 42°, the angle of pivotal movement $\theta_l$ of the left knuckle arm 15 is about 23° but the angle of pivotal movement $\theta_r$ of the right knuckle 16 is about 36°. This phenomenon gives rise to the problem that, since this difference represents the difference in the angle of revolution of the left and right wheels, not shown, it is impossible to swerve the vehicle body stably when the handle lever 11 is turned greatly. The same phenomenon occurs when the handle lever 11 is turned greatly to the left.

SUMMARY OF THE INVENTION

This invention has been developed for the purpose of obviating the aforesaid problem of the prior art. Accordingly, the invention has as its object the provision of a handle lever steering device of three-wheel and four-wheel automotive vehicles having improved maneuverability in steering a handle lever capable of preventing the difference in the pivotal angle between the left and right knuckle arms from becoming too great even if the handle lever is turned through a great pivotal angle.

According to the invention, there is provided a handle lever steering device of three-wheel and four-wheel automotive vehicles comprising a handle lever supported by a rotary shaft connected to a frame, a left knuckle arm supported by a rotary shaft connected to the frame and disposed on the left side of said rotary shaft for supporting the handle lever and a right knuckle arm supported by a rotary shaft connected to the frame and disposed on the right side of said rotary shaft for supporting the handle lever, the aforesaid parts constituting the Ackermann mechanism, a support shaft connected to a left arm of said left knuckle arm and another support shaft connected to a right arm of said right knuckle arm, a rod end connected to said rotary shaft for supporting the handle lever and having a first support shaft and a second support shaft connected thereto, and a tie rod connecting the support shaft connected to said left arm to the first support shaft of the rod end and another tie rod connecting the support shaft connected to said right arm to the second support shaft of the rod end, wherein the improvement resides in that said first support shaft and said second support shaft of said rod end are located on an imaginary straight line extending through the center of said rotary shaft for supporting the handle lever in a front-to-rear direction, and the ratio of the distance $Y_l$ between the center of the rotary shaft for supporting the handle lever and the center of the first support shaft of the rod end to the distance $X_l$ between the center of the rotary shaft for supporting the left knuckle arm and the center of the support shaft connected to the left arm is substantially equal to the ratio of the distance $Y_r$ between the center of the rotary shaft for supporting the handle lever and the center of the second support shaft of the rod end to the distance $X_r$ between the center of the rotary shaft for supporting the right knuckle arm and the center of the support shaft connected to the right arm.

By virtue of the aforesaid constituent features of the invention that the first support shaft and second support shaft of the rod end are located on the imaginary straight line extending through center of the rotary shaft for supporting the handle lever and that the ratio $Y_l/X_l$ is substantially equal to the ratio $Y_r/X_r$, the angle of pivotal movement of the left and right knuckle arms can be kept in an optimum range even if the handle lever is turned rightwardly or leftwardly through an angle of a maximum value. This is conducive to stable steering of the handle lever when the vehicle body is swerved. Thus, the handle lever steering device according to the invention is suitable for use with threewheel and four-wheel automotive vehicles for travelling off-road (in the rough country).

DESCRIPTION OF THE PREFERRED EMBODIMENT

A preferred embodiment of the invention will now be described by referring to the accompanying drawings.

Figure 2:
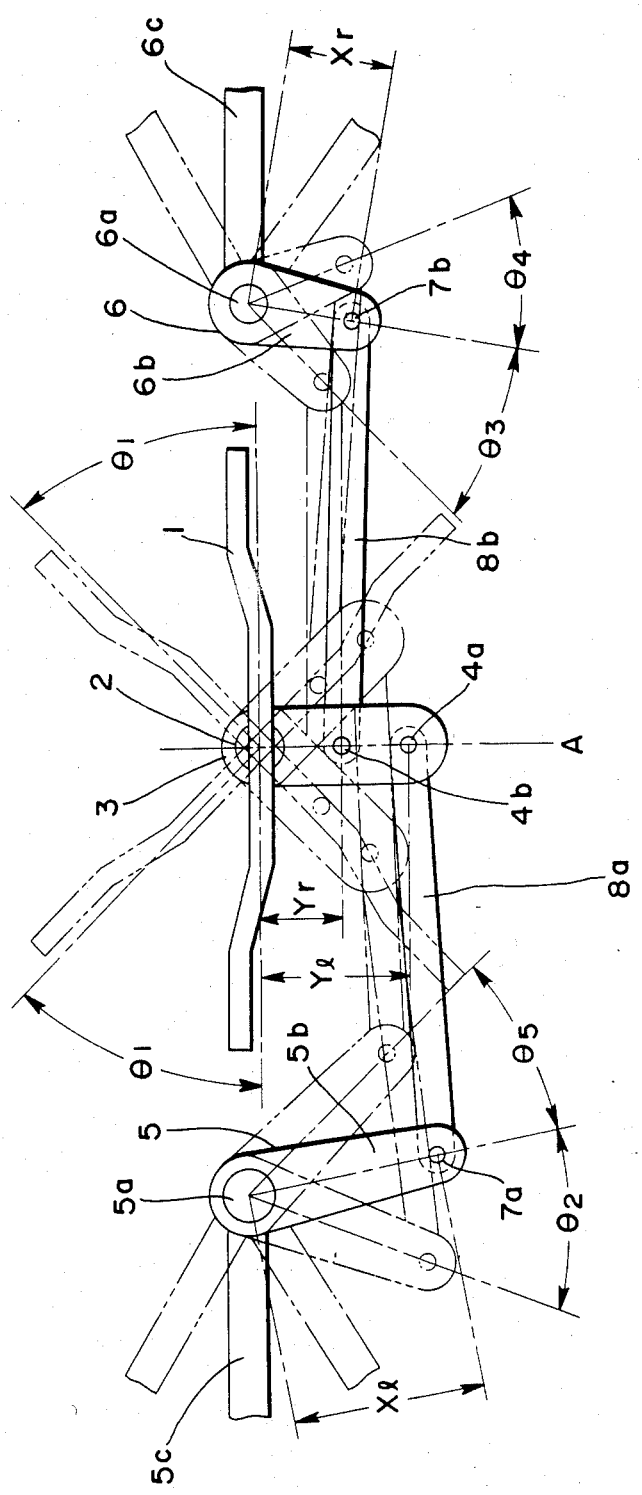
FIG. 2 is a plan view of the handle lever steering device comprising one embodiment of the invention.

FIG. 2 shows a handle lever steering device according to the invention suitable for use with three-wheel and four-wheel automotive vehicles, comprising a handle lever 1 supported for pivotal movement by a rotary shaft 2 supported by a frame, not shown, and a rod end 3 of an elliptic form secured to the rotary shaft 2. The rod end 3 has connected thereto a first support shaft 4a and a second support shaft 4b located on an imaginary straight line A extending in a front-to-rear direction through the center of the rotary shaft 2, the first support shaft 4a being disposed in a position remote from the center of the rotary shaft 2 and the second support shaft 4b being disposed in a position near the center of the rotary shaft 2. Left and right knuckle arms 5 and 6 are pivotally supported by rotary shafts 5a and 6a, respectively, which are supported by the frame, not shown, and the left and right knuckle arms 5 and 6 include a left arm 5b and a right arm 6b having a support shaft 7a and a support shaft 7b, respectively. Axles 5c and 6c are located on the outer sides of the left arm 5b and right arm 6b, respectively. A left tie rod 8a connects the support shaft 7a of the left arm 5b to the first support shaft 4a of the rod end 3, and a right tie rod 8b connects the support shaft 7b of the right arm 6b to the second support shaft 4b of the rod end 3. In the handle lever steering device of the aforesaid construction, the parts constitute the Ackermann mechanism in which the left arm 5b of the left knuckle arm 5 and the right arm 6b of the left knuckle arm are oriented toward the center of the axis of rear wheels, not shown, when a vehicle body, not shown, is travelling straight-forwardly. The center of the rotary shaft 2 supporting the handle lever 1 and the center of the first support shaft 4a of the rod end 3 are spaced apart from each other by a distance $Y_l$, and the center of the rotary shaft 5a supporting the left knuckle arm 5 and the center of the support shaft 7a of the left arm 5b are spaced apart from each other by a distance $X_l$. The center of the rotary shaft 2 and the center of the second support shaft 4b of the rod end 3 are spaced apart from each other by a distance $Y_r$, and the center of the rotary shaft 6a supporting the right knuckle arm 6 and the center of the support shaft 7b of the right arm 6b are spaced apart from each other by a distance $X_r$. The ratio $Y_l/Y_l$ is substantially equal to the ratio $Y_r/X_r$.

Operation of the handle lever steering device of the aforesaid construction will be described by setting the dimensions as follows:

The distance $Y_l=71$ (from the center of the rotary shaft 2 supporting the handle lever 1 to the center of the first support shaft 4a of the end rod 3);

The distance $Y_r=41$ (from the center of the rotary shaft 2 to the center of the second support shaft 4b of the rod end 3);

The distance $X_l=90$ (from the center of the rotary shaft 5a supporting the left knuckle arm 5 to the center of the support shaft 7a of the left arm 5b);

The distance $X_r=52$ (from the center of the rotary shaft 6a supporting the right knuckle arm 6 to the center of the support shaft 7b of the right arm 6b); and The distance $Z=280$ (from the center of the rotary shaft 2 to the centers of the rotary shaft 5a supporting the left knuckle arm 5 and the rotary shaft 6a supporting the right knuckle arm 6).

Thus, these values are set as follows: $Y_l/X_l \approx Y_r/X_r \approx 0.788$.

In the handle lever steering device of the aforesaid dimensions, when the handle lever 1 is turned rightwardly so that the handle lever pivoting angle $\theta_1$ becomes 42° which is near the uppermost limit of the pivoting angle of the handle lever 1, the pivoting angle $\theta_z$ of the left knuckle arm 5 which is disposed on the outer wheel side and the pivoting angle $\theta_3$ of the right knuckle arm 6 which is disposed on the inner wheel side are 30° and 34°, respectively. Thus, the difference ($\theta_3-\theta_2$) between the right and left knuckle arms 6 and 5 is 4°. This difference represents a difference in angle substantially corresponding to the difference in radius between an arc drawn by an inner wheel, not shown, of the vehicle body, not shown, and an arc drawn by an outer wheel, not shown, of the vehicle body. Also, when the handle lever 1 is turned leftwardly so that the handle lever pivoting angle $\theta_1$ becomes 42°, the pivoting angle $\theta_4$ of the right knuckle arm 6 which is disposed on the outer wheel side and the pivoting angle $\theta_5$ of the left knuckle arm 5 which is disposed on the inner wheel side are 30° and 34°, respectively, so that the difference in the pivoting angle between the left and right knuckle arms 5 and 6 ($\theta_5-\theta_4$) is 4°.

It will be seen that when the handle lever 1 is turned rightwardly and leftwardly through a pivoting angle which is near the upper limit of the range of handle lever pivoting angles, no great difference is produced between the left and right knuckle arms 5 and 6 in pivoting angle. This is achieved by the constituent features of the invention that the first support shaft 4a and second support shaft 4b of the rod end 3 are located on the imaginary straight line A extending through the center of the rotary shaft 2 for supporting the handle lever 1 in a front-to-rear direction, and that the ratio $Y_l/X_l$ is substantially equal to the ratio $Y_r/X_r$.

What is claimed is:

1. A handle lever steering device of three-wheel and four-wheel automotive vehicles comprising:

a handle lever supported by a rotary shaft connected to a frame;

a left knuckle arm supported by a rotary shaft connected to the frame and disposed on the left side of said rotary shaft for supporting the handle lever and a right knuckle arm supported by a rotary shaft connected to the frame and disposed on the right side of said rotary shaft for supporting the handle lever, the aforesaid parts constituting an Ackermann mechanism;

a support shaft connected to a left arm of said left knuckle arm and another support shaft connected to a right arm of said right knuckle arm;

a rod end connected to said rotary shaft for supporting the handle lever and having a first support shaft and a second support shaft connected thereto; and a first tie rod connecting the support shaft connected to said left arm to the first support shaft of the rod end and a second tie rod connecting the support shaft connected to said right arm to the second support shaft of the rod end; wherein the improvement resides in that:

said first support shaft and said second support shaft of said rod end are located on an imaginary straight line extending through the center of said rotary shaft for supporting the handle lever in a front-to-rear direction, and the ratio of the distance $Y_l$ between the center of the rotary shaft for supporting the handle lever and the center of the first support shaft of the rod end to the distance $X_l$ between the center of the rotary shaft for supporting the left knuckle arm and the center of the support shaft connected to the left arm is substantially equal to the ratio of the distance $Y_r$ between the center of the rotary shaft for supporting the handle lever and the center of the second support shaft of the rod end to the distance $X_r$ between the center of the rotary shaft for supporting the right knuckle arm and the center of the support shaft connected to the right arm wherein the distance $X_l$ between the center of the rotary shaft for supporting the left knuckle arm and the center of the support shaft connected to the left arm is substantially different than the distance $X_r$ between the center of the rotary shaft for supporting the right knuckle arm and the center of the support shaft connected to the right arm.

* * * * *